United States Patent [19]

Iwamoto

[11] Patent Number: 5,458,013

[45] Date of Patent: Oct. 17, 1995

[54] POSITION WITH LIMITED TORQUE TRANSMISSION IN ONE DRIVE DIRECTION AND RELEASE IN THE OPPOSITE DRIVE DIRECTION

[75] Inventor: Masayuki Iwamoto, Shizuoka, Japan

[73] Assignee: Shinohara Machinery Co., Ltd., Shizuoka, Japan

[21] Appl. No.: 94,452

[22] Filed: Jul. 19, 1993

[51] Int. Cl.[6] .............................. F16H 19/00; F16D 21/04
[52] U.S. Cl. .................................. 74/322; 192/20; 192/45; 101/247
[58] Field of Search ................... 74/322, 323; 475/323, 475/324; 192/20, 45, 48.92; 101/182, 183, 184, 185, 218, 230, 247

[56] References Cited

FOREIGN PATENT DOCUMENTS 58-71163  4/1983  Japan .
61-85436  6/1986  Japan .

Primary Examiner—Charles A. Marmor
Assistant Examiner—Mary Ann Battista
Attorney, Agent, or Firm—Ladas & Parry

[57] ABSTRACT

A coupling structure for a reversing mechanism of a printing press, having a fixed gear (18), a pivotable regulating gear (20), and a plurality of parallel tightening bolts (30) extending in a regularly spaced manner around a cylinder shaft (12) of the reversing mechanism. A one-way clutch (54) transmits limited tightening torque to the bolts (30) to hold gears (18) and (20) together in an engaged state, whereas in a release state, the bolts (30) are freely loosened. A center gear 56 having an internal gear (62) transmits torque to the one-way clutch from an external drive motor (80).

11 Claims, 8 Drawing Sheets

POSITION WITH LIMITED TORQUE TRANSMISSION IN ONE DRIVE DIRECTION AND RELEASE IN THE OPPOSITE DRIVE DIRECTION

FIELD OF THE INVENTION

This invention relates to a reversing mechanism for carrying out switching between one side and two side printing in a sheet-fed printing press, and more particularly to a coupling structure for use in regulating, when two side or perfecting printing is carried out, the mutual phases of a plurality of gears, which are mounted on an end portion of a shaft of a reversing cylinder, in accordance with the size of the sheet in use and fixedly positioning these gears.

DESCRIPTION OF THE PRIOR ART

In a sheet-fed printing press, printing is carried out on one side of a sheet, i.e. one side printing in which one surface only of a sheet is printed, and perfecting printing in which both the front and back surfaces of a sheet are printed. In the case of one side printing, a plurality of printing units each of which consists of a plate cylinder, blanket cylinder, a pressure cylinder and an inking arrangement are connected together by a double-sized cylinder, and one surface only of a sheet is printed. In the case of perfecting printing, a reversing mechanism consisting of a sheet feed cylinder, a double-sized intermediate cylinder and a reversing cylinder is interposed between a plurality of printing units, and a printed sheet is reversed, the rear surface thereof then being printed. In an example of perfecting printing, the front surface of a sheet is printed in four colors, and the rear surface thereof in two colors.

The key elements in a sheet reversing operation are the reversing cylinder and a reversing gripper thereof. During perfecting printing, which is different from one side printing in which the leading edge of a sheet is transferred simply from one printing unit to a downstream printing unit via a double-sized cylinder, a reversing gripper receives the trailing edge of a sheet from a rear gripper of a double-sized intermediate cylinder positioned on the upstream side of the reversing cylinder, and the front and rear surfaces of the sheet are reversed by rotation of the reversing cylinder to transfer the sheet to a pressure cylinder of a printing unit positioned downstream of the reversing cylinder.

Since the reversing gripper of the reversing cylinder receives the trailing edge of a sheet from the double-sized cylinder on the upstream side thereof, it is necessary that the transfer of the trailing edge from the double-sized intermediate cylinder to the reversing cylinder be set in accordance with the size of the sheet. The size of a sheet passed through a sheet-fed printing press can vary, and, moreover, the gears on the cylinders in a printing unit and those in a reversing mechanism are meshed continuously, and driven in a time-regulated manner. Therefore, it is necessary that the phase of the driving gears for the cylinders positioned on the upstream side of the reversing cylinder and that of the driving gears for the cylinders positioned on the downstream side thereof be regulated in accordance with the size of the sheet in use when perfecting printing is carried out.

To meet these requirements, gears meshed with the upstream driving gears and gears meshed with the downstream driving gears are mounted on an end portion of a shaft of the reversing cylinder so that the mutual phases thereof in the rotational direction can be regulated, and a phase regulating operation is carried out in accordance with the necessity mentioned above, to couple these gears with the cylinder shaft.

Japanese Utility Model Laid-Open No. 85436/1986 discloses a coupling structure having as shown in FIG. 8 a fixed gear 102 mounted firmly on an end portion of a shaft 100 of a reversing cylinder and in mesh with a driving gear (not shown) on the downstream side thereof, a pivotable regulating gear 104 provided in parallel with the fixed gear 102 and in mesh with a driving gear (not shown) on the upstream side thereof, a lever 110 supported by a pin 106, urged by a spring 108 and pressing at one end thereof the regulating gear 104 against the fixed gear 102 so as to fix the former to the latter, and a means 112 adapted to press the other end portion of the lever 110 from the outer side of the reversing cylinder so as to release the regulating gear 104 from the force of lever 110.

Although this coupling structure can be remote controlled externally thereof, a gear coupling operation is carried out only by the spring 108 and lever 110. Therefore, this coupling structure is unreliable as a coupling structure for a reversing mechanism which is used continuously under severe conditions.

Japanese Patent Laid-Open No. 71163/1983 discloses as shown in FIG. 9 another coupling structure having a fixed gear 200, a pivotable regulating gear 202, a plurality of through bolts 208 extending in portions of the fixed gear 200 which are spaced regularly around a cylinder shaft 206, through keep plates 204 so as to position thereby the regulating gear 202 and fixed gear 200 unitarily and firmly, a plurality of gear-carrying nuts 210 for tightening the bolts 208, and a center pinion 212 for turning the gear-carrying nuts 210 collectively.

This coupling structure cannot be remote controlled externally of the reversing cylinder, so that the switching of one side printing to perfecting printing must be done manually by an operator. Moreover, the through bolts 208 and gear-carrying nuts 210 have the problem of varying the tightening force, and no means for dealing with this problem. Therefore, this coupling structure is unsatisfactory.

SUMMARY OF THE INVENTION

The present invention has been developed in view of these problems, and provides an advanced coupling structure for reversing mechanisms, an object of the invention being to enable a gear coupling operation to be carried out reliably and stably, in which the coupling structure can be remote controlled externally thereof with high reliability, and without the problem of varying tightening forces on the gear tightening bolts.

To achieve this object, the coupling structure for reversing mechanisms according to the present invention comprises a fixed gear 18 mounted firmly on an end portion of a shaft 12 of a reversing cylinder and in mesh with a downstream driving gear 24, a regulating gear 20 provided pivotably around the cylinder shaft 12 and in parallel with the fixed gear 18 and in mesh with an upstream driving gear 26, a plurality of tightening bolts 30 which extend through keep plates 28 in parallel with and in a regularly spaced manner around the cylinder shaft 12 thereby to engage the regulating gear 20 and the fixed gear 18 unitarily and firmly, the bolts 30 being provided with one-way clutch means 54 capable of absorbing gear tightening torque which exceeds a predetermined level and transmitting gear releasing torque as is to the tightening bolts 30, a center gear 56 which is supported rotatably around the cylinder shaft 12, and which has an internal gear 62 adapted to transmit torque to the one-way clutch means 54 for the tightening bolts 30, and an external gear 66 for receiving torque, both gears 62, 66 being formed integrally with the center gear 56, and a driving means 82 adapted to transmit torque from a motor 80 outside the reversing cylinder to the center gear 56 via a clutch means 72.

When the clutch means 72 for the driving means 82 is connected so as to release the fixedly positioned regulating gear 20, so that the releasing torque from the driving means 82 is transmitted to the tightening bolts 30 via the external gear 66 of the center gear 56, internal gear 62 thereof and one-way clutch means 54 for the tightening bolts 30, these bolts 30 are loosened, and the keep plates 28 set the regulating gear 20 free.

The regulating gear 20 is then turned with respect to the fixed gear 18 through an angle corresponding to a rotary phase as required by the size of the sheet.

The clutch means 72 for the driving means 82 is then connected so as to couple the regulating gear 20 with the fixed gear 12 again, and the tightening torque from the driving means 82 is transmitted to the tightening bolts 30 via the external gear 66 of the center gear 56, internal gear 62 thereof and one-way clutch means 54 for the tightening bolts 30. During this time, excess torque above a predetermined level on the tightening bolts 30 is absorbed in the one-way clutch means 54.

Owing to such action of the parts, the individual problems with the tightening bolts 30 are eliminated, and the tightening condition of all of the tightening bolts 30 can be made uniform. Moreover, the coupling of the gears is effected with perfect reliability, and the remote control of the coupling structure is carried out perfectly with no manual work required.

The above and other objects of the present invention will become apparent from the following description of the preferred embodiment taken in conjunction with the accompanying drawings. However, the following description is only a description of an embodiment of the present invention, and the present invention is not limited to the embodiment.

DESCRIPTION OF THE PREFERRED EMBODIMENT

Figure 1:
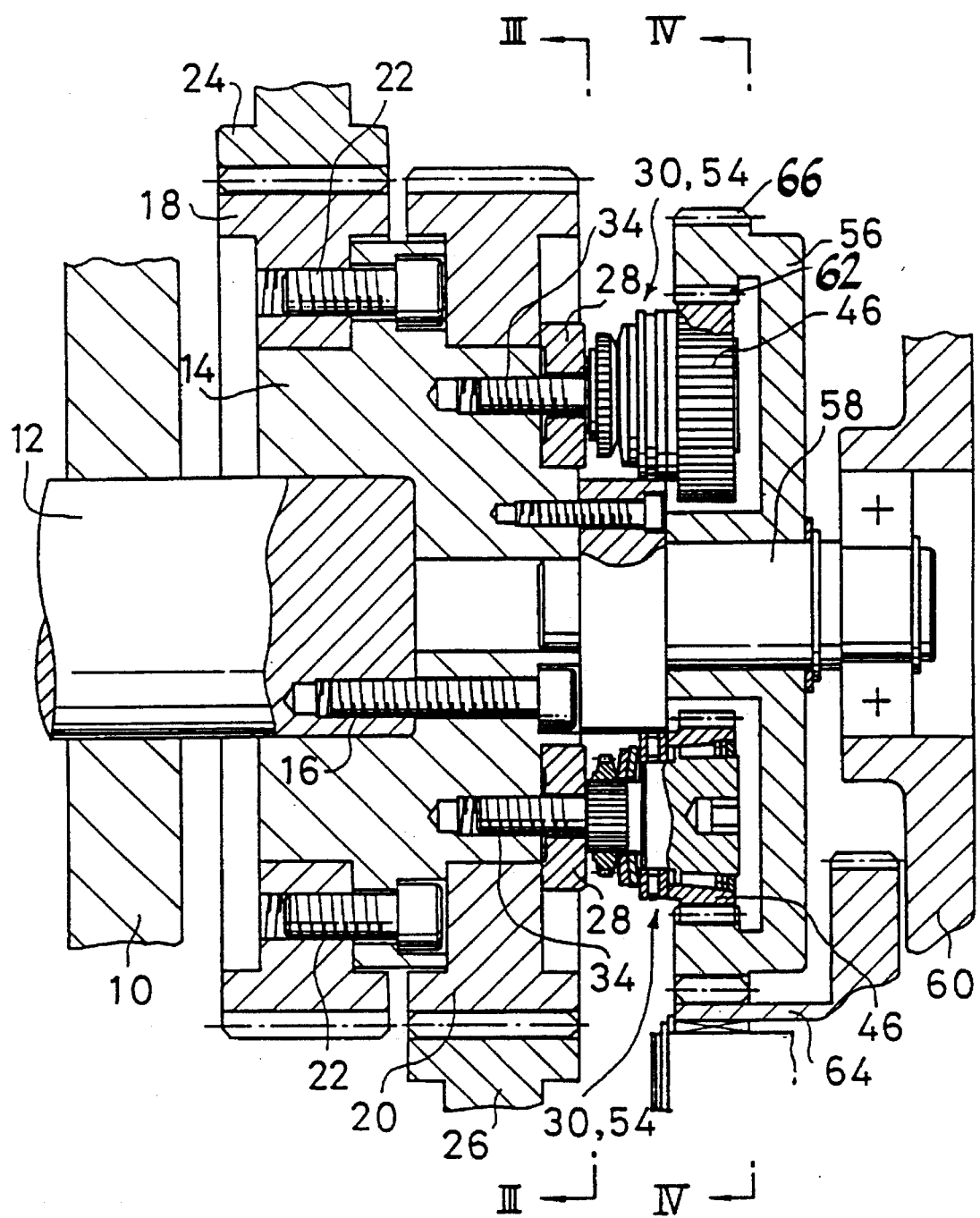
FIG. 1 is a sectional view of a principal portion of an embodiment of the coupling structure for reversing mechanisms according to the present invention.

Reference numeral 10 denotes a side wall of a sheet-fed printing press, a shaft 12 of a reversing cylinder being supported rotatably on a pair of side walls 10. A mounting ring 14 is fixed by bolts 16 to an end portion of the cylinder shaft 12, and a fixed gear 18 and a regulating gear 20 are mounted on ring 14.

The fixed gear 18 is secured by bolts 22 to the ring 14. A driving gear 24 for a pressure cylinder of, for example, a printing unit, which is on the downstream side of a reversing cylinder (not shown), is meshed with fixed gear 18.

The regulating gear 20 is provided parallel to the fixed gear 18 so that the regulating gear 20 can be turned with respect to the ring 14 and also cylinder shaft 12, and a driving gear 26 of, for example, a double-sized intermediate cylinder, which is on the upstream side of the reversing cylinder, is meshed with regulating gear 20.

The coupling structure according to the invention is utilized to fix the position of the regulating gear 20, which can be turned around the cylinder shaft 12, with respect to the ring 14, i.e. fixed gear 18 via keep plates 28 after the phase of the regulating gear 20 has been regulated for carrying out perfecting printing. To carry out the positioning of regulating gear 20, a plurality of tightening bolts 30 are provided.

Figure 3:
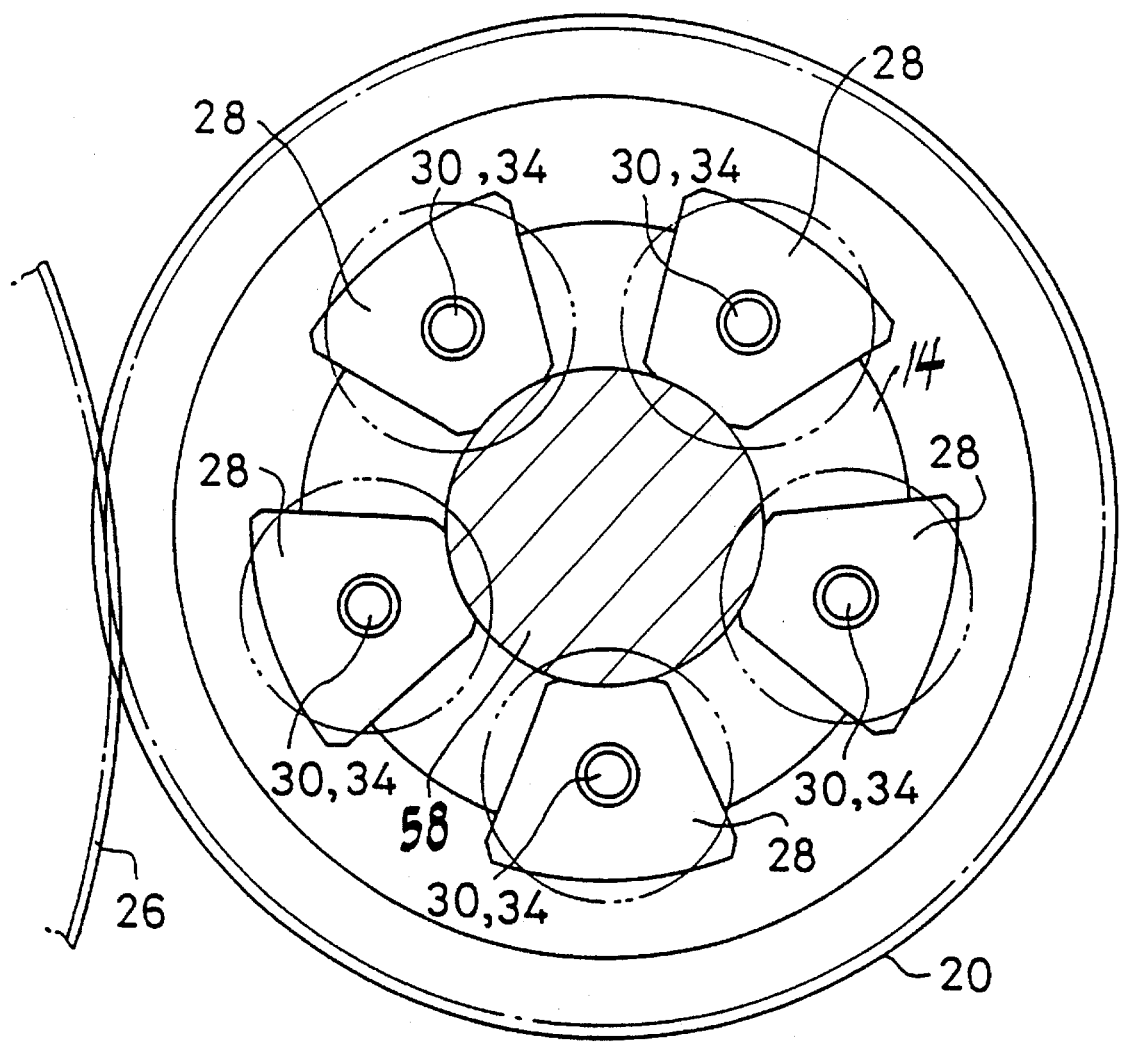
FIG. 3 is a sectional view taken along line III—III in FIG. 1.
Figure 4:
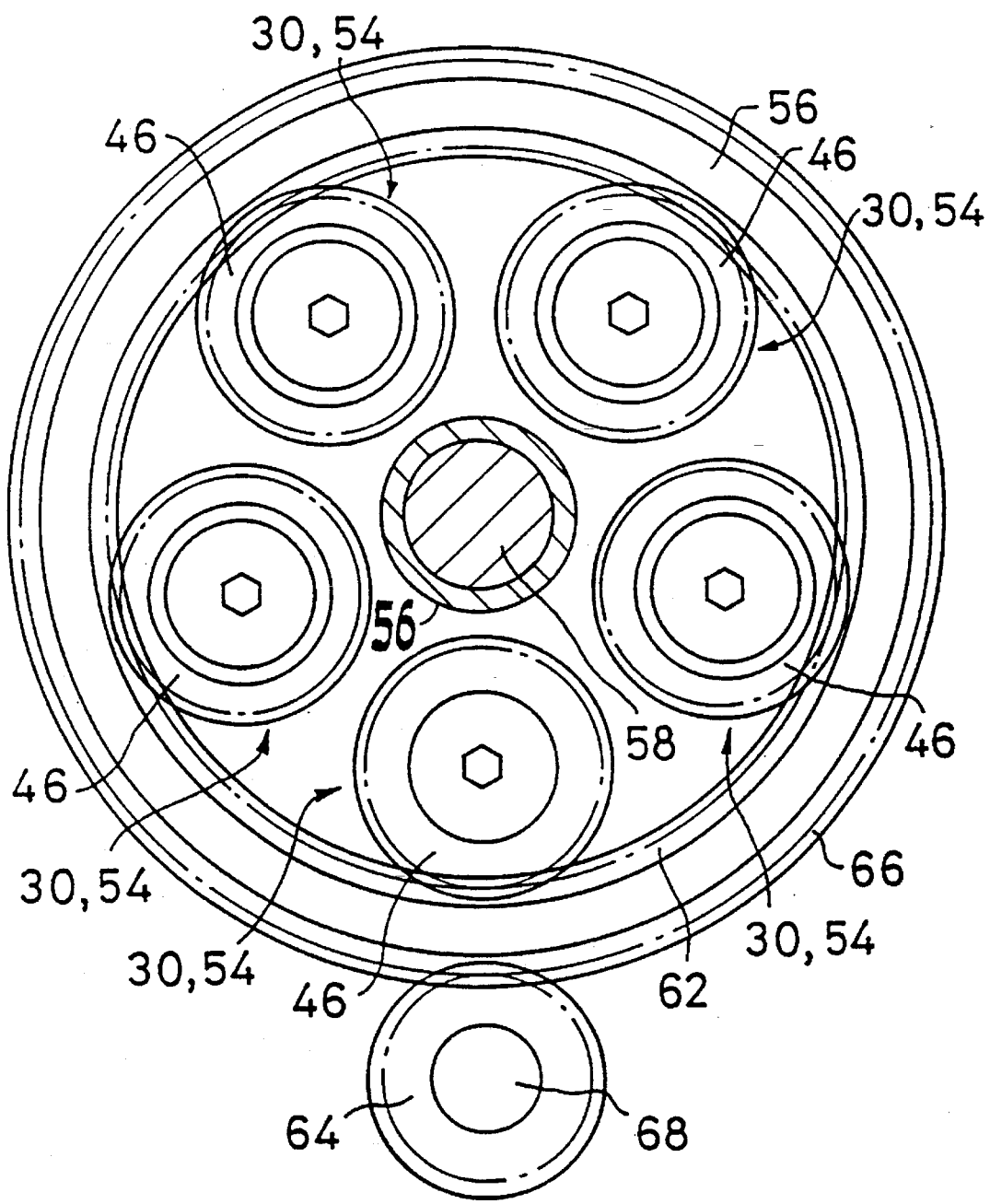
FIG. 4 is a sectional view taken along line IV—IV in FIG. 1.

As shown in FIGS. 3 and 4, the tightening bolts 30 and keep plates 28 are attached to the ring 14 at regular spaced intervals in the circumferential direction of the cylinder shaft 12.

Figure 5:
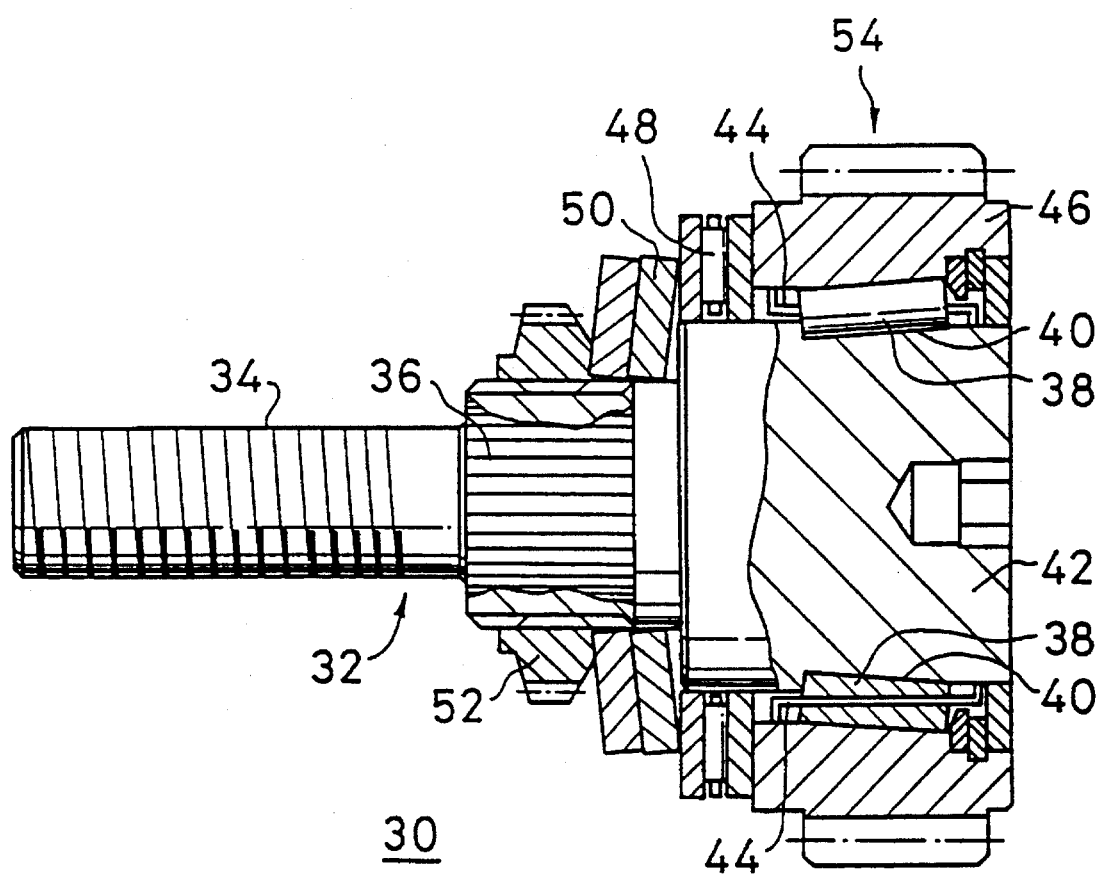
FIG. 5 is a sectional view of one tightening bolt.

The details of a tightening bolt 30 are shown in FIG. 5. A bolt body 32 consists of a neck portion 34 the outer circumferential surface of which is threaded, an intermediate-diameter portion 36 continuing from the neck portion 34 and also having a thread on the outer circumferential surface thereof, and a larger-diameter portion 42 having a race surface 40 for a plurality of rollers 38. The rollers 38 are inclined at a predetermined helix angle, by retainers 44, on the race surface 40 on the outer circumference of the larger-diameter portion 42. An outer race gear 46 having teeth on the outer circumferential surface thereof is fitted around the larger-diameter portion 42 so as to enclose the rollers 38.

Reference numeral 48 denotes a pre-load receiving bearing, which is also provided on the larger-diameter portion 42 and urged against an end surface of the outer race gear 46 by two pre-load springs 50 fitted around the intermediate-diameter portion 36. The springs 50 are adapted to generate a predetermined level of spring pressure by a spring pressure regulating nut 52. The rollers 38 and outer race gear 46 constitute a one-way clutch means 54 for the tightening bolt 30.

The functions of the one-way clutch means 54 will now be described with reference to FIGS. 6 and 7. First, in order to loosen the tightening bolt 30, the outer race gear 46 is turned in the direction of the arrow in FIG. 6. Consequently, the rollers 38 arranged on the race surface 40 so as to be inclined at a predetermined helix angle are put in a tighten-locking state, i.e., a so-called eat-clutching state with respect to the larger-diameter portion 42. Accordingly, releasing torque is transmitted from the outer race gear 46 to the larger-diameter portion 42, and the tightening bolt 30 is loosened to cause the keep plates 28 to set the regulating gear 20 free.

Figure 7:
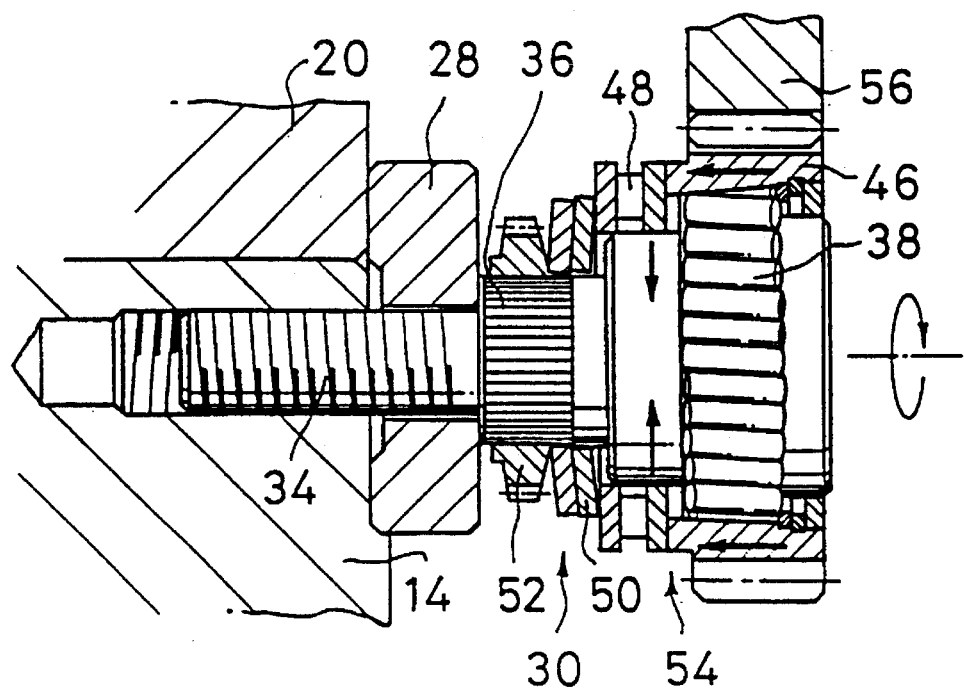
FIG. 7 is a sectional view illustrating the transmission of tightening torque to a tightening bolt.
Figure 8:
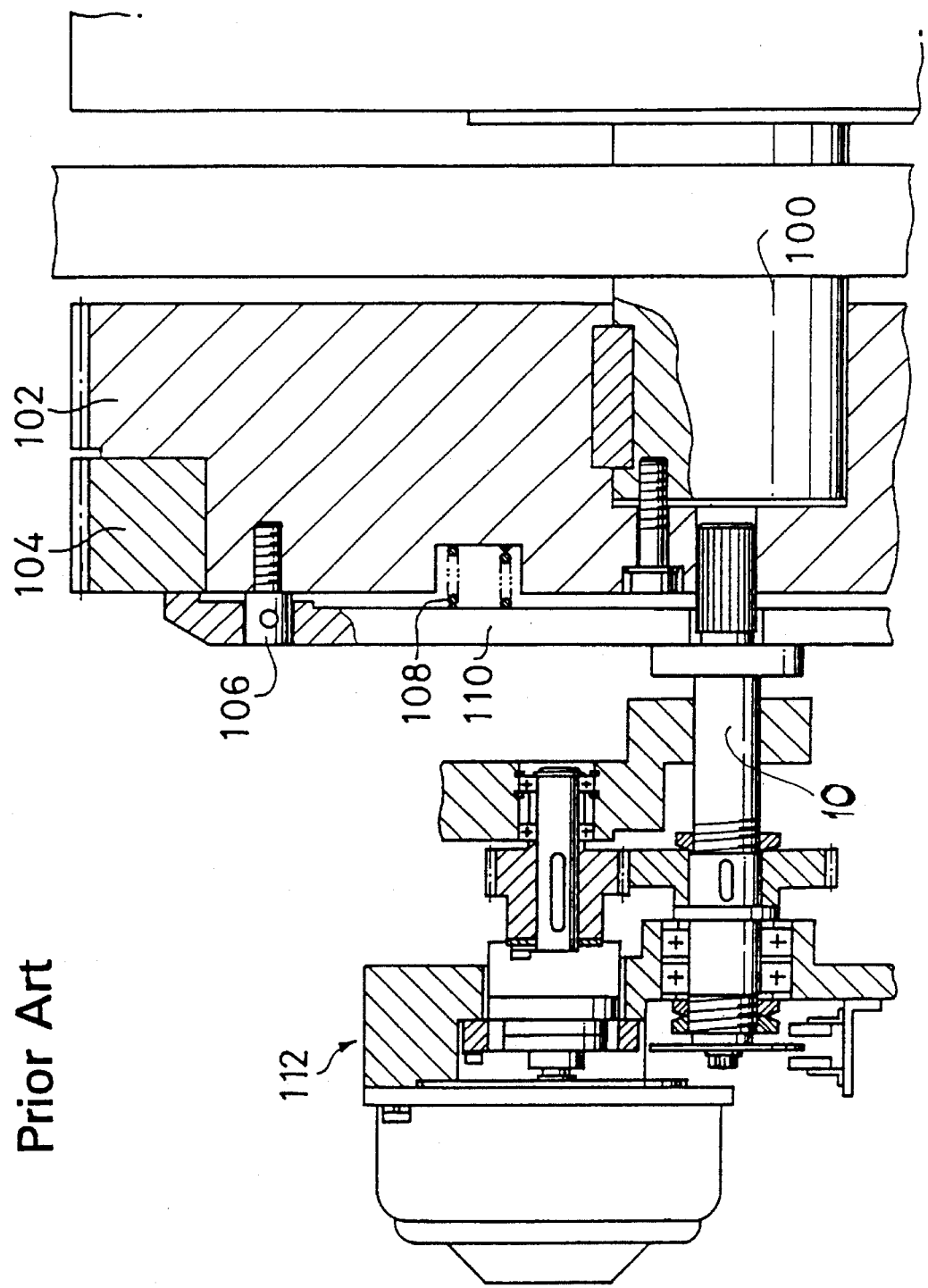
FIG. 8 is a sectional view illustrating a conventional coupling structure.
Figure 9:
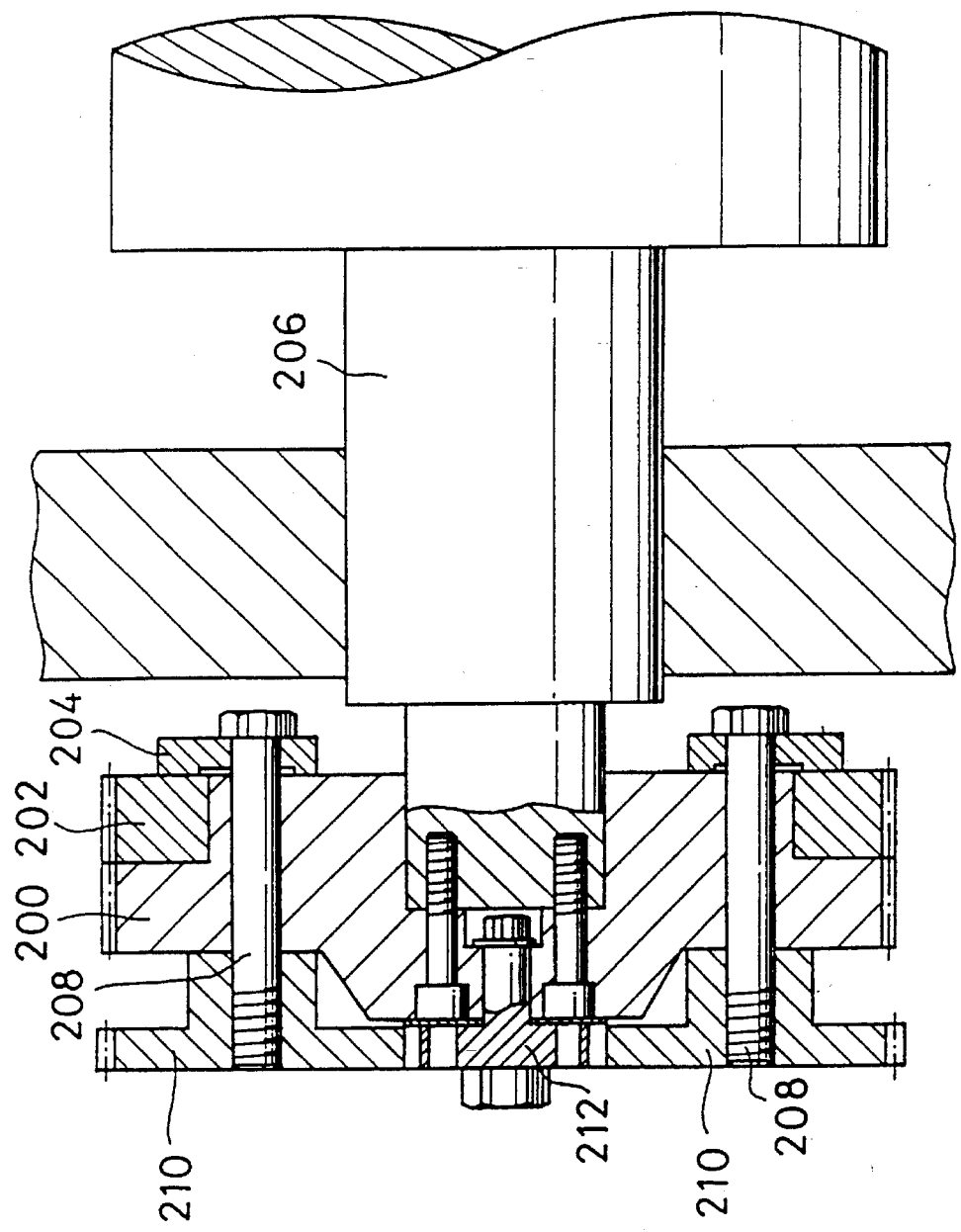
FIG. 9 is a sectional view illustrating another conventional coupling structure.

Conversely, in order to tighten the tightening bolt 30, the outer race gear 46 is turned in the direction of the arrow in FIG. 7. Since the rollers 38 are separated from one another and roll in a free state during this time, they do not transmit any torque to the larger-diameter portion 42. The part transmitting tightening torque to the larger-diameter portion 42 during this time is the pre-load receiving bearing 48 which is urged against an end portion of the outer race gear 46 by the pre-load springs 50. A predetermined level of spring pressure is generated in the pre-load springs 50 by the spring pressure regulating nut 52. A tightening torque of up to a predetermined level, which is proportional to the spring pressure, is transmitted to the larger-diameter portion 42 via the pre-load receiving bearing 48. However, when the tightening torque has exceeded a predetermined level, slip occurs in the pre-load receiving bearing 48, and transmission of tightening torque up to the predetermined level is carried out, so that the tightening torque of a predetermined constant level only is transmitted at all times to the tightening bolt 30.

In other words, the one-way clutch means 54 for the tightening bolt 30 is adapted to absorb the portion of the tightening torque which exceeds the predetermined level and transmit the releasing torque as is to the tightening bolt 30.

Referring to FIG. 1 again, a center gear 56 serves to transmit torque collectively to a plurality of tightening bolts 30 which are spaced circumferentially at regular intervals. A gear shaft 58 of the center gear 56 is joined at an end portion thereof to the central portion of the mounting ring 14, and the other end portion thereof is supported on a guide frame 60. The center gear 56 can be turned freely around gear shaft 58 as well as the cylinder shaft 12, and has as shown in FIG. 4 the internal gear 62 meshed with the outer race gears 46 of the one-way clutch means 54, and the external gear 66 for receiving thereon the torque from a relay gear 64, the internal and external gears 62, 66 being formed integrally with the center gear 56.

Figure 2:
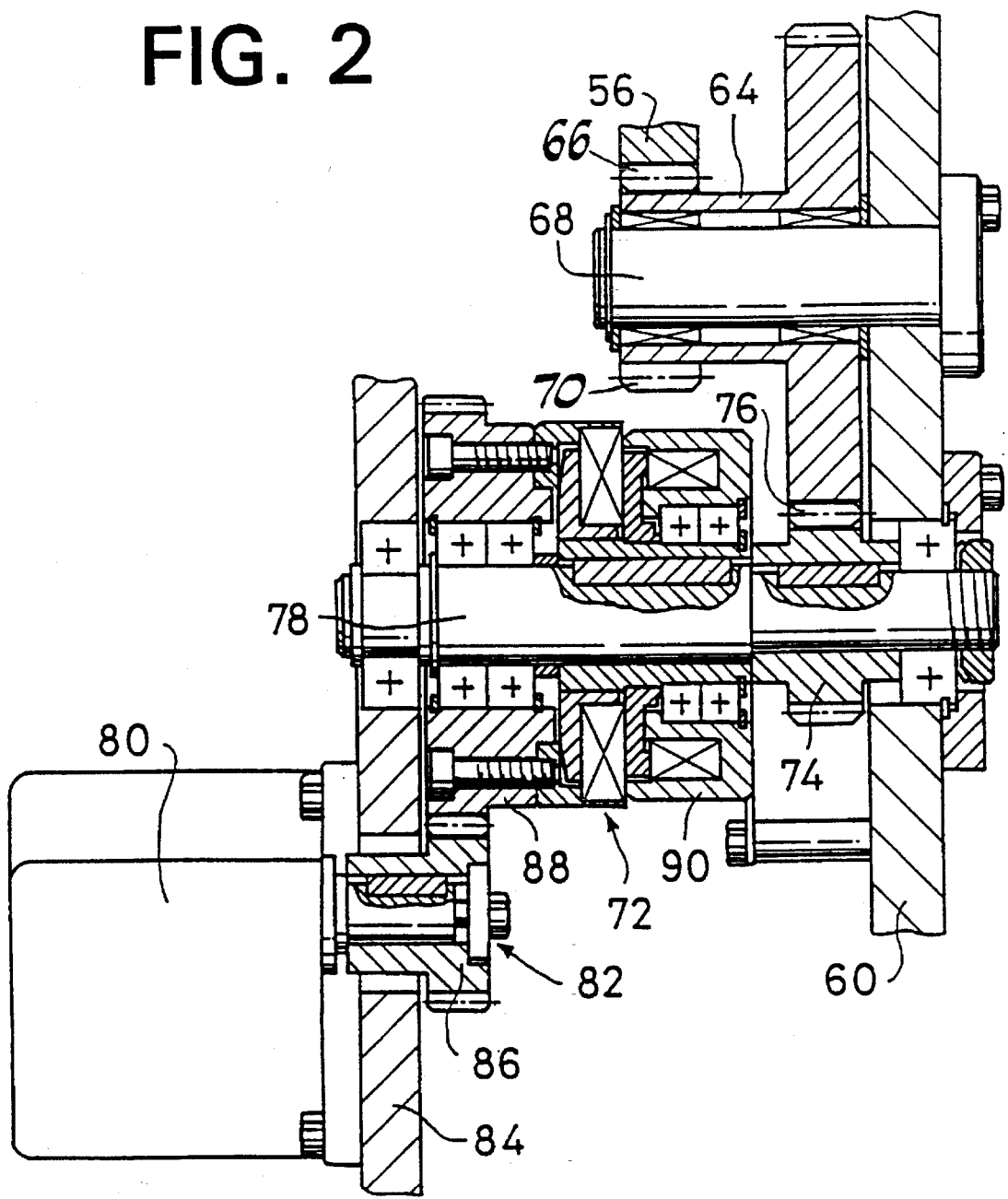
FIG. 2 illustrates a driving means of the coupling structure.

The relay gear 64 is supported rotatably on a shaft 68 (FIG. 2) provided on the guide frame 60, and has first teeth 70 meshed with the external gear 66 of the center gear 56, and second teeth 76 meshed with a gear 74 of the clutch means 72, the teeth 70, 76 being formed integrally with the relay gear 64.

A member extending from the gear 74 mounted fixedly on a clutch shaft 78 connected to a motor 80 constitutes a driving means 82 including the clutch means 72. Namely, the clutch shaft 78 is supported rotatably between a subframe 84 and the guide frame 60, and torque is transmitted from a motor gear 86 connected to the motor 80 to a clutch gear 88 mounted rotatably on the clutch shaft 78. A fixed member 90 constituting an electromagnetic portion of clutch means 72 is mounted on the clutch shaft 78 so as to be opposed to the clutch gear 88. Only when the clutch gear 88 and fixed member 90 are electromagnetically coupled (condition shown in FIG. 2), will the torque of the motor 80 be transmitted from the clutch shaft 78 to the gear 74, relay gear 64, center gear 56, and outer race gears 46 of the tightening bolts 30 in the mentioned order.

The operation of the embodiment will now be described. In order to release the regulating gear 20 from the fixed positioning force, the motor 80 for the driving means 82 is rotated through the electromagnetic clutch means 72 put in an ON-state. The torque of the motor 80 is transmitted to the outer race gears 46 of the tightening bolts 30 via the clutch gear 88, fixed member 90, clutch shaft 78, gear 74, relay gear 64, external gear 66 of the center gear 56 and internal gear 62 thereof.

Figure 6:
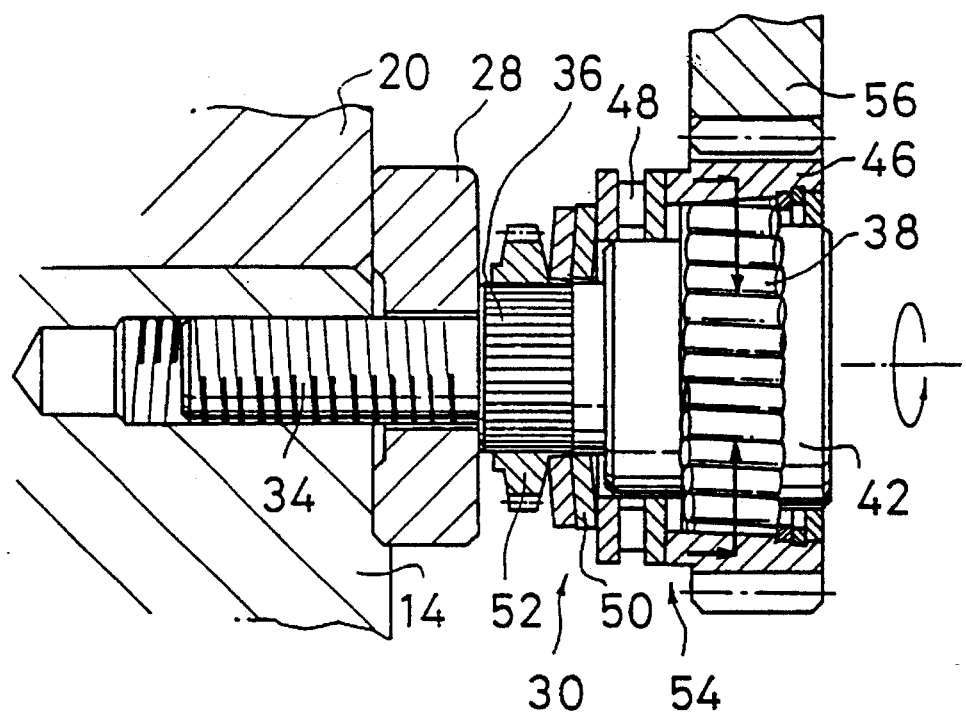
FIG. 6 is a sectional view showing the function of a one-way clutch means for a tightening bolt, in which the transmission of releasing torque to the bolt is illustrated.

The torque transmitted to the outer race gear 46 is transmitted as a releasing torque to the larger-diameter portion 42 of the tightening bolt 30 due to the eat-clutching effect of the rollers 38 as shown in FIG. 6. Consequently, the tightening bolts 30 are loosened to cause the keep plate 28 to free the regulating gear 20.

An operation for regulating the phase of the regulating gear 20 is carried out by turning the gear 20 through a required angle of rotation by a motor (not shown) or a handle-carrying gear (not shown) based on the size of the sheet to be printed. A means for turning regulating gear 20 is well known, and its construction is not an object of the present invention.

In order to couple the regulating gear 20 again with the mounting ring 14 as well as the fixed gear 18 after it has thus been turned, the motor 80 is turned in a direction opposite the direction described previously, with the clutch means 72 connected. As a result, the center gear 56 and outer race 46 are also turned in a direction opposite the direction described previously. During this time, the rollers 38 do not carry out any further transmission of torque to the tightening bolts, and tightening torque is transmitted to the tightening bolts via the pre-load receiving bearing 48 to cause the tightening bolts 30 to apply pressure against the keep plates 28 against the regulating gear 20. However, when the tightening torque has exceeded a prescribed constant level produced by the force of the pre-load springs 50, slip occurs on the pre-load receiving bearing 48, and the transmission of the tightening torque above the prescribed level is not carried out.

While a regular printing operation is carried out, i.e., while the shaft 12 of the reversing cylinder is rotated continuously, the parts up to the fixed member 90 on the clutch shaft 78 out of various members of the structure according to the present invention are driven, and a load for carrying out such driven rotation of the members functions as a means for preventing the loosening of the tightening bolts 30.

The coupling structure for reversing mechanisms according to the present invention not only enables a gear coupling operation to be completely automated but also effects its gear coupling function with high reliability and safety and permits itself to be used as a coupling structure of high sophistication.

The present invention is not limited to the embodiment described above; it can be extended and modified variously.

I claim:

1. A coupling structure mounted on a shaft of a reversing cylinder of a reversing mechanism comprising:

a fixed gear fixedly secured relative to said shaft of said reversing cylinder and connected in driving relation with a downstream driving gear, a regulating gear pivotable around said shaft of said reversing cylinder in parallel relation to said fixed gear and connected with an upstream driving gear, a plurality of keep plates mounted around said shaft of said reversing cylinder to selectively press said regulating gear against said fixed gear, a plurality of tightening bolts acting in respective said keep plates, a drive gear to drive the tightening bolts in one turning direction to cause the keep plates to press the regulating gear against the fixed gear and thereby couple the regulating gear and the fixed gear in driving relation, and to drive the tightening bolts in an opposite turning direction to release the keep plates and the driving relation of the regulating gear and the fixed gear, a one-way clutch assembly acting between the drive gear and the tightening bolts to transmit torque from the drive gear to the tightening bolts up to a limit value of torque in said one turning direction, and a drive unit connected to said drive gear to drive said drive gear in two opposite directions.

2. A coupling structure as claimed in claim 1, wherein said tightening bolts extend loosely through said keep plates and are threadably engaged to press said regulating gear and said fixed gear together by said keep plates as said tightening bolts are driven in said one turning direction.

3. A coupling structure as claimed in claim 1, wherein said tightening bolts extend parallel to the shaft of the reversing cylinder in uniformly spaced circumferential relation around said shaft.

4. A coupling structure as claimed in claim 1, wherein said drive gear to drive the tightening bolts comprises a center gear supported for rotation around said shaft of the reversing cylinder, said center gear having an internal gearing to transmit torque to said one-way clutch assembly and an external gearing for being externally driven.

5. A coupling structure as claimed in claim 4, wherein said drive unit is connected to said center gear and comprises an external motor, and a drive connection including a clutch between said motor and said center gear.

6. A coupling structure as claimed in claim 1, wherein said one-way clutch assembly includes a race roller assembly having a first locked state in which the drive gear and the tightening bolts are connected together for torque transmission and a second free state in which torque is not transmitted, and springs acting on the race roller assembly so that in said second free state said race roller assembly will transmit said limit value of torque from the drive gear to the tightening bolts based on pressure force of said springs.

7. A coupling structure as claimed in claim 6, wherein in said first locked state of the race roller assembly torque is transmitted from the drive gear to the tightening bolts in a direction to loosen said tightening bolts whereas in said second free state of the race roller assembly torque is transmitted from the drive gear to the tightening bolts via said springs in a direction to tighten said tightening bolts.

8. A coupling structure as claimed in claim 7, wherein said drive gear to drive the tightening bolts comprises a center gear supported for rotation around said shaft of the reversing cylinder, said center gear having an internal gearing to transmit torque to said one-way clutch assembly and an external gearing for being externally driven.

9. A coupling structure as claimed in claim 8, wherein said internal gearing of said center gear is in driving engagement with said race roller assembly.

10. A coupling structure as claimed in claim 9, wherein said race roller assembly includes an outer race gear in mesh with said internal gearing of said center gear, said outer race gear having an inner race surface, each of said tightening bolts including a bolt body disposed within said outer race gear, said bolt body having an outer race surface, and a plurality of rollers disposed around said bolt body on said outer race surface thereof and engaged by said inner race surface of said outer race gear, said rollers being inclined on said outer race surface of said bolt body.

11. A coupling structure as claimed in claim 10, wherein said inner and outer race surfaces are disposed at an angle relative to an axis of rotation of a respective said tightening bolt.

\* \* \* \* \*